United States Patent Office 2,971,152
Patented Feb. 7, 1961

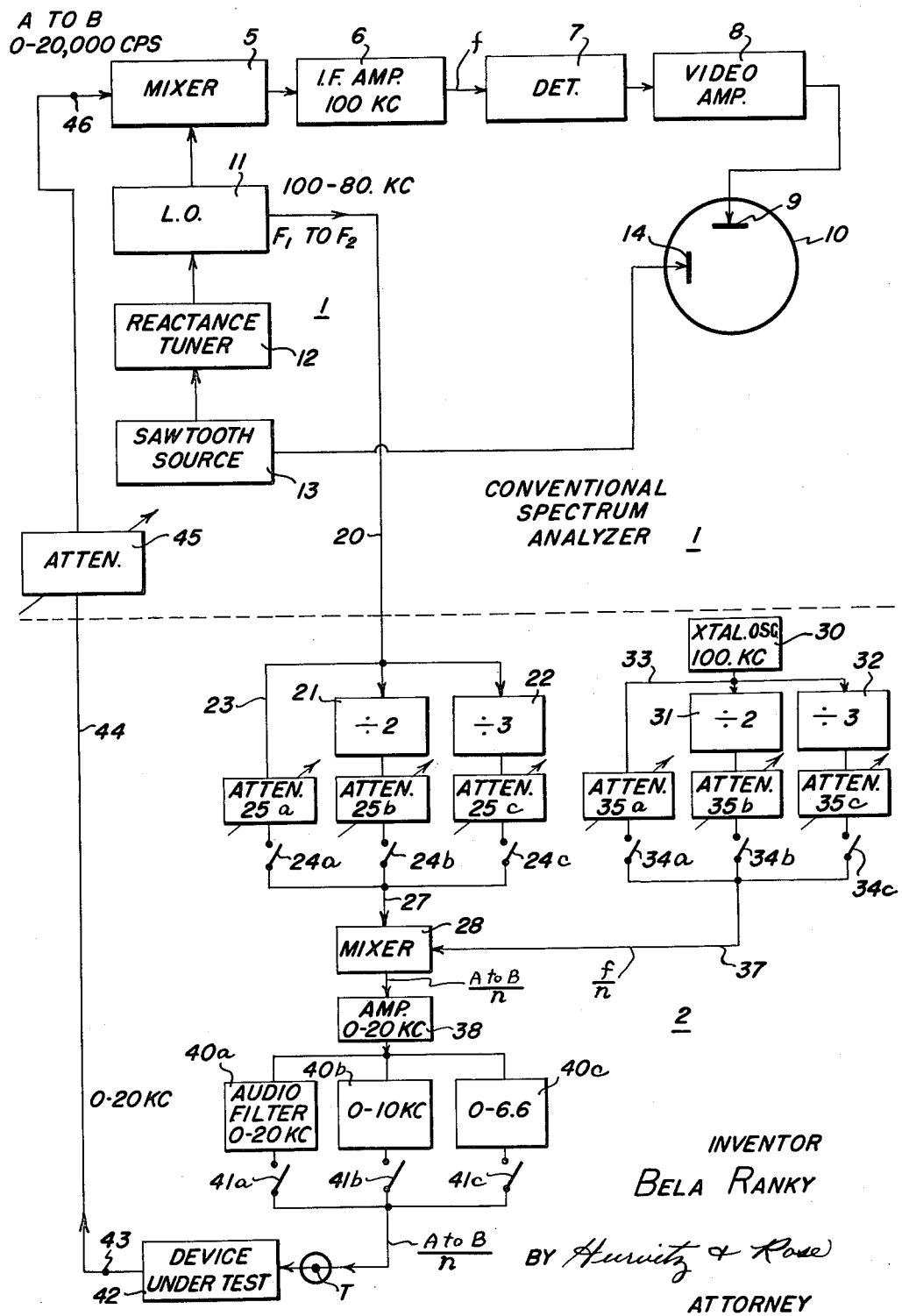

2,971,152

HARMONIC SPECTRUM ANALYZER

Bela Ranky, Flushing, N.Y., assignor to Panoramic Radio Products, Inc., Mount Vernon, N.Y., a corporation of New York Filed Apr. 17, 1958, Ser. No. 729,167

8 Claims. (Cl. 324—57)

The present invention relates generally to circuit response plotting systems, and more particularly to systems for obtaining plots of harmonic frequency against amplitude responses of a circuit under test.

It is conventional practice according to the prior art to test frequency response of a circuit by frequency scanning through the circuit a signal of constant amplitude, and measuring the amplitude of output signal derivable from the circuit under test, for each input frequency. Spectrum analyzers are also known, which essentially consist of superheterodyne type receivers having scanning local oscillators, the scan of the local oscillator being synchronized with the horizontal deflection of the beam of a cathode ray tube, and the vertical deflection of the beam of the cathode ray tube being controlled by the output of the receiver. Such systems are commercially manufactured and sold in large numbers and are available for analyzing bands of frequencies in a wide variety of frequency ranges. Spectrum analyzers have heretofore been employed as components of circuit response testing systems of the frequency scanning type, by employing the local oscillator of the spectrum analyzer as one component of a circuit scanning signal. In such systems the local oscillator frequency is applied to a mixer, in conjunction with a fixed frequency equal to the frequency of the intermediate frequency amplifier of the spectrum analyzer, whereby there may be derived from the output of the mixer a scanning difference frequency equal at all times to the acceptance frequency of the spectrum analyzer. In such systems the input signal to the spectrum analyzer is continuously scanning in synchronism with the local oscillator of the spectrum oscillator, so that the I.F. signal generated in the spectrum analyzer falls always at the center of the I.F. response curve. Accordingly, the spectrum analyzer system does not introduce a modulation or variation of amplitude due to the overall shape of its transfer characteristic, but the output of the spectrum analyzer is conditioned only by the response or transfer characteristic of the device under test.

Furthermore, since spectrum analyzers exist commercially for application in a wide variety of frequency bands, the response curves or transfer characteristics of circuits which it is desired to test, may be plotted for similar bands of frequencies by providing suitable accessories for conventional spectrum analyzers. Such an accessory is required to derive from a spectrum analyzer its scanning local oscillator frequency, to convert the local oscillator frequency to the frequency to which the input circuit of the spectrum analyzer is responsive, and to pass that signal through the circuit being tested before application to the input terminals of the spectrum analyzer. Accordingly, a spectrum analyzer of conventional character, per se, may be readily converted by addition of an accessory to a system for plotting the response or transfer characteristic of a circuit which it is desired to test. Where a spectrum analyzer is in any event available, a system according to the invention may be simple and of low cost, since effectively it utilizes all the expensive frequency measuring, signal amplifying and display components of the spectrum analyzer, and adds thereto inexpensive elements.

There exists a subsidiary problem in the testing of circuit responses, namely, the testing of harmonic frequency responses. For example, it may be desired to know what the second harmonic response of an amplifier is, over the audio band of frequencies, or to know what the third harmonic response of the amplifier is, and in general to know what the $n^{th}$ harmonic response may be, where $n$ is an integer. It may also be desirable to enable easy comparison of the first harmonic, second harmonic and third harmonic response curves of a circuit under test, under identical conditions of operation of the circuit.

In accordance with the present invention a standard spectrum analyzer is employed, consisting essentially of a mixer, I.F. amplifier, detector and video amplifier in cascade, the output of the video amplifier being applied to the vertical deflection electrode of a cathode ray tube indicator. To the mixer is applied the output of a scanning local oscillator, the output frequency of which is controlled by a reactance tube modulator, to which is supplied sawtooth modulating voltage. The modulating voltage is applied to the horizontal deflection electrodes of the cathode ray tube indicator, suitable changes of scale or shape of the sawtooth being introduced, if desired, to provide a frequency base line suited to a given application. Such a spectrum analyzer, which is conventional, per se, and which in its commercial embodiment may be in some respects more complex than is herein described, may have an acceptance input range extending from A to B c.p.s., say 0–20,000 c.p.s. In such case, the center frequency of the I.F. amplifier may be $f$, (say, 100,000 c.p.s.) the local oscillator may be caused to scan over a band of frequencies F1 to F2, say 100–80 kc./s. In accordance with the present invention an adapter is supplied for utilization with the spectrum analyzer, consisting of digital divider networks coupled to the local oscillator and capable selectively of dividing the frequency of the output of the latter by the factors 1, 2, 3 . . . $n$. There is also supplied a crystal local oscillator source, having an output frequency precisely equal to the center frequency of the I.F. amplifier, i.e., $f$. From this crystal oscillator may be derived signals of frequency $f/2$, $f/3$ . . . $f/n$, by suitable digital division networks, and the division factor for the output of the scanning local oscillator as well as the output of the crystal oscillator may be selected at will by closing a suitable manual switch. The frequency divided outputs, having frequencies $$\frac{F1 \text{ to } F2}{n}$$

and $f/n$ are applied to a mixer, from which is derived by means of a suitable filter, a difference frequency equal to $$\frac{A \text{ to } B}{n}$$

In effect, the frequency divider of the local oscillator is heterodyned with a fixed frequency, such as to generate a sub-harmonic frequency $$\frac{A \text{ to } B}{n}$$

wherein the band $$\frac{A \text{ to } B}{n}$$

is scanned in synchronism with the scanning of the local oscillator and under the direct and rigid control of the latter. The sub-harmonic frequencies so generated are applied to a circuit to be tested, such as an audio amplifier or the like, and the harmonic output of the latter is then applied to the input of the spectrum analyzer. Since the input of the spectrum analyzer accepts frequencies A to B, while the input to the circuit under test is composed of frequencies $$\frac{A \text{ to } B}{n}$$

i.e., of sub-harmonics of the band A to B, the only frequencies displayed by the spectrum analyzer will be harmonic response frequencies of the circuit under test, and those specific harmonic responses will be selected which correspond with the division factor employed.

It will be clear that several division factors may be employed if frequency divider circuits in parallel are employed. This enables the display on the face of the cathode ray tube indicator of any harmonic response, at will. It may, for example, be desired to display in rapid succession both the second and third harmonic responses, or the first, second and third harmonic responses. Since the various division circuits may be selected by the expedient of closing a switch, the circuit under test need not be disturbed for the several harmonic response curves which may be plotted according to the invention. Since moreover all circuit parameters of the test system may be maintained constant during a series of tests, amplitude comparison of the several harmonic response curves is feasible, and all response curves may be plotted to the same scale or to commensurate scales.

It is, accordingly, a broad object of the present invention to provide a system for plotting the harmonic frequency response characteristic of a circuit.

It is another object of the present invention to provide a system for modifying a conventional spectrum analyzer for generating a harmonic response plot of a circuit under test.

It is another object of the invention to provide an accessory for a conventional spectrum analyzer, which adapts the conventional spectrum analyzer to plot harmonic frequency response curves of active or passive circuits.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a system according to the present invention.

Referring now more specifically to the accompanying drawings, the reference numeral 1 denotes a conventional spectrum analyzer, which for the sake of example only may accept for analysis an input band of frequencies 0 to 20,000 c.p.s. The receiver may employ an I.F. frequency of 100 kc. and local oscillator frequencies of 100 to 80 kc. The reference numeral 2 denotes an accessory which may be connected with the spectrum analyzer 1 in order to provide a harmonic response spectrum analyzer capable of testing the harmonic as well as the fundamental response or transfer characteristic of a circuit which it is desired to test.

The spectrum analyzer 1 is conventional, and is illustrated and described in simplified form to avoid unnecessary complication of the present description. Spectrum analyzer 1 includes in cascade a mixer 5, an I.F. amplifier 6, a detector 7, a video amplifier 8 and the vertical deflection electrode 9 of a cathode ray tube indicator 10. Coupled with the mixer 5 is a local oscillator 11, the frequency of which is caused to scan over the band 100 to 80 kc. periodically and repetitively by means of a reactance tube tuner 12 driven from a source of sawtooth voltage 13. The sawtooth voltage is then applied to the horizontal deflection electrode 14 of the cathode ray tube indicator 10. It will be assumed that the selectivity of the I.F. amplifier 6 is maintained at a value adequate to the purposes of the present invention, which requires that the selectivity be adequate to distinguish between a given signal in the band 0 to 20,000 c.p.s., and second and third harmonics of that frequency.

Coupled with the local oscillator 11 is an output lead 20, which connects in parallel with a digital divide-by-two circuit 21, a digital divide-by-three circuit 22 and a lead 23. Lead 23 is provided with a switch 24a. At the output of the divide-by-two circuit 21 is provided a manual switch 24b. A similar switch 24c is provided at the output of the digital divide-by-three circuit 22. In series with switch 24a is an adjustable attenuator 25a. In series with switch 24b is an adjustable attenuator 25b, and a similar attenuator 25c is connected in series with switch 24a. The three switches then commonly connect via a lead 27 to a mixer 28.

A crystal oscillator 30 is provided having a frequency of output $f=100$ kc. This is precisely equal to the I.F. amplifier center frequency assigned to the I.F. amplifier 6. From the crystal oscillator 30 is coupled in parallel a digital divide-by-two circuit 31, a digital divide-by-three circuit 32 and a lead 33. In cascade with these circuits are provided adjustable attenuators 35a, 35b and 35c, respectively. In the output of the digital divide-by-two circuit 31 is provided a switch 34b, while in the output of the digital divide-by-three circuit 32 is provided a similar switch 34c and in series with the lead is provided still another such switch 34a. The switches commonly proceed via a lead 37 to the mixer 28. In the output circuit of the mixer 28 is provided an amplifier 38 of pass band 0–20 kc., feeding three audio filters 40a, 40b, 40c having pass bands 0–20 kc., 0–10 kc. and 0–6.6 kc., respectively, which are selectable by switches 41a, 41b, 41c, respectively.

A terminal T is provided at the outputs of the audio filters 40a, 40b and 40c, to which may be connected an input circuit or terminals of a device, system or circuit which is to be tested, and which is identified by the reference numeral 42. The output terminal or circuit of the device under test 42, is identified by the reference numeral 43, and proceeds via a lead 44 and through an adjustable attenuator 45 to the input terminal 46 of the spectrum analyzer 1.

In operation, the spectrum analyzer 1 is capable of accepting normally a band of frequencies from 0 to 20,000 c.p.s., all simultaneously, and as the local oscillator 11 scans over its band of frequencies, the frequency content of the input band is sampled frequency-by-frequency, being converted to the I.F. frequency 100 kc., detected, amplified and displayed on the face of the cathode ray tube indicator 10.

It will be observed that when the local oscillator frequency has a value of 100 kc. the input frequency 0 c.p.s. is converted to the center frequency of I.F. amplifier 6 and indicated in respect to its amplitude on indicator 10. When the local oscillator frequency has a value 80 kc., the input frequency 20 kc. at the terminal 46 is indicated. Accordingly, if it is desired to plot from 0 to 20,000 c.p.s., in sequence, the local oscillator frequency may be caused to scan from 100 kc. to 80 kc., in sequence.

Assuming now that the switches 24a, 34a and 41a are closed, switches 24b, 24c, 34b, 34c being open, the scanning local oscillator frequency 100 to 80 kc. is passed directly to the input of the mixer 28 while a 100 kc. fixed frequency is passed to the mixer 28 from the crystal oscillator 30. It follows that the output of the audio amplifier 40 will vary between 0 and 20 kc., periodically. Since the effective acceptance band of the spectrum analyzer 1 is likewise varying from 0 to 20 kc., periodically, the acceptance frequency of spectrum analyzer 1 tracks at all times with the input frequency applied thereto. Accordingly, only the fundamental frequency response of the device under test 42 is plotted by the spectrum analyzer 1. Any harmonic response generated by the device under test 42 falls outside the acceptance band of the spectrum analyzer at the instant when this harmonic response is generated. It is thus feasible to plot the fundamental response of the device under test 42 to the exclusion of responses due to harmonic distortion generated in the device under test 42.

If now the switches 24b, 34b, 41b be closed and the switches 24a, 24c, 34a, 34c, 41a, 41c be open, the scanning frequencies applied to the mixer 28 will be 50 to 40 kc., deriving from the local oscillator 11, and 50 kc. from the crystal oscillator 30. Under these conditions the output of the mixer 28 will vary over the band 0 to 10 kc. as the local oscillator 11 scans over its band 100 to 80 kc. However, the spectrum analyzer 1 taken as a whole is simultaneously scanning the band 0 to 20,000 c.p.s. Accordingly, only the second harmonic response of the device under test 42 will be accepted by the spectrum analyzer 1 in the course of its scan.

In still a third condition, the switches 24a, 24b, 34a, 34b, 41a, 41b may be open and the switches 24c, 34c, 41c closed. In this situation the input to the mixer 28 consists of the third sub-harmonic of the local oscillator frequency and the third sub-harmonic of the oscillator 30, the difference frequency then extending from 0 to 6.6 kc., as the local oscillator 11 scans over the band 100 kc. to 80 kc. Since during this time the scanning local oscillator accepts frequencies in the band 0 to 20,000 c.p.s., taken in sequence, only the third harmonic response of the device under test 42 will be plotted on the face of the cathode ray tube indicator 10.

Still further, any set of switches, of subscripts a or b or c, may be closed whereby the indicator 10 will indicate the fundamental, second harmonic or third harmonic responses of the system selectively. It is then known whether the response curve of the system under test at a given input frequency represents response to a fundamental, a second harmonic or a third harmonic frequency. Since in many cases, the harmonic response of a system, for example, a high fidelity amplifier, is quite small in comparison to the fundamental response, attenuators 25a, 25b, 25c and 35a, 35b, 35c may be included in series with the switches and may be manipulated to introduce predetermined fixed attenuations, without changing the operating parameters of the overall system, and particularly of the device under test 42. In such case, the response of the system may be designed to be perfectly flat over the frequency band of interest.

It will be appreciated that when the local oscillator frequency derived from the local oscillator 11 passes directly to the mixer 28, without the interposition of frequency division circuits, different amplitudes of input signal will apply to the mixer 28 than when frequency dividers are interposed. Comparison of response curves for the various switch positions may be effected by suitable adjustment of the calibrators pertaining to the several switch positions.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A system of frequency response analysis of a device under test, including a first mixer having an input circuit for a first relatively wide band of frequencies, a narrow band intermediate frequency amplifier coupled in cascade to said first mixer, means for generating a visual indication, means for deflecting said visual indication in the direction of a frequency coordinate, means for deflecting said visual indication in a further direction in response to signal output of said intermediate frequency amplifier, a first local oscillator coupled to said first mixer in heterodyning relation thereto, means for varying the frequency of said local oscillator over a band such as to convert the frequencies of said first relatively wide band of frequencies in succession to substantially the center frequency of said narrow band intermediate frequency amplifier, a second mixer, a second source of local oscillations having a frequency which is a predetermined sub-harmonic including unity of the center frequency of said narrow band intermediate frequency amplifier, means for dividing the output frequency of said first local oscillator to obtain a predetermined sub-harmonic thereof, means for coupling said second source of local oscillations and said means for dividing to said second mixer in heterodyning relation, means for selecting one band of conversion products from the output of said second mixer, and means for passing the selected band of conversion products through said device under test and thence to said input circuit for said first relatively wide band of frequencies of said mixer.

2. The combination according to claim 1, wherein said means for generating a visual indication is a cathode ray tube indicator.

3. In a system for detecting the harmonic response of a circuit under test, including a scanning superheterodyning spectrum analyzer having an input circuit and a scanning local oscillator of frequency F1 to F2, an indicator for indicating the response of said spectrum analyzer to a band of input signals applied to said input circuit and an intermediate frequency amplifier of predetermined central response frequency $f$, communicating with said input circuit and said indicator, the combination of means for providing a source of fixed frequency $f/n$, where $n$ is an integer greater than unity, means responsive to said scanning local oscillator for providing a source of signals of frequency $$\frac{F1 \text{ to } F2}{n}$$

means for heterodyning said signals of frequency $f/n$ with said signals of frequency $$\frac{F1 \text{ to } F2}{n}$$

to obtain a signal of difference frequency, and means for applying said signal of difference frequency to said input circuit via said circuit under test.

4. In a system for detecting the harmonic response of a circuit under test, and including a scanning superheterodyning spectrum analyzer having an input circuit and a scanning local oscillator of frequency F1 to F2, coupled with said input circuit, an indicator for indicating the response of said spectrum analyzer to a band of input signals applied to said input circuit and an intermediate frequency amplifier of predetermined central response frequency $f$, communicating with said input circuit and said indicator, the combination of means for providing a source of fixed frequency $f/n$, where $n$ is selectively one of a plurality of integer values, and wherein means is provided for selecting one of the values of $n$, means responsive to said scanning local oscillator for providing a source of signals of frequency $$\frac{F1 \text{ to } F2}{n}$$

means for heterodyning said signals of frequency $f/n$ with said signals of frequency $$\frac{F1 \text{ to } F2}{n}$$

to obtain a signal of heterodyne frequency, and means for applying said signal of heterodyne frequency to said input circuit via said circuit under test.

5. A harmonic response measuring system for measuring the harmonic response of a system under test, comprising a frequency scanning spectrum analyzer arranged to display a plot of frequencies vs. amplitudes of a band of frequencies A to B, means for deriving from said spectrum analyzer a further band of frequencies $$\frac{f \pm A \text{ to } B}{n}$$

where $f$ is a fixed frequency and $n$ is a digit greater than unity and where the frequencies A to B are scanned in succession, means for generating a fixed frequency $f/n$, means for mixing the frequencies $$\frac{f \pm A \text{ to } B}{n}$$

with the frequency $f/n$ to obtain a difference heterodyne product $$\frac{A \text{ to } B}{n}$$

means for passing said difference heterodyne product through said system under test, and means for applying the signal output of said circuit under test to said spectrum analyzer for spectrum analysis thereby.

6. A system for plotting the harmonic response of a circuit under test to a frequency scanning test signal, comprising, a spectrum analyzer arranged for plotting the frequency content of a band of frequencies A to B, said spectrum analyzer including a scanning oscillator, means responsive to said scanning oscillator for generating a scanning band of frequencies $$\frac{A \text{ to } B}{n}$$

where $n$ is an integer greater than unity, said circuit under test having input and output terminals, means for applying said scanning band of frequencies $$\frac{A \text{ to } B}{n}$$

to said input circuit, and means for coupling said output circuit to said spectrum analyzer.

7. A spectrum analyzing system, comprising a mixer, an I.F. amplifier of center frequency $f$, a detector and a video amplifier all in cascade, a scanning local oscillator coupled to said mixer, said scanning local oscillator scanning over a band of frequencies F1 to F2, the acceptance band of said I.F. amplifier including difference frequencies generated by heterodyning $f$ and (F1 to F2), at least one frequency divider coupled to said local oscillator having a divider factor $n$ greater than unity to provide signal of frequency $$\frac{F1 \text{ to } F2}{n}$$

means for providing signal of a fixed frequency $f/n$, and means for combining the signals of frequency $$\frac{F1 \text{ to } F2}{n}$$

with said signal of frequency $f/n$ to generate signals of frequencies scanning over the band equal to one of the differences of $f/n$ and $$\frac{F1 \text{ to } F2}{n}$$

8. In combination, in a system for testing the harmonic response of a circuit having input and output terminals, spectrum analyzer means for scanning first a band of signals A to B in succession, means for deriving from said means for scanning a further scanned band of signals $$\frac{A \text{ to } B}{n}$$

where $n$ is an integer greater than unity, means for applying said further scanned band of signals to said input terminals, and means for connecting said spectrum analyzer means to said output terminals.

References Cited in the file of this patent

UNITED STATES PATENTS

| | | |
|---|---|---|
| 2,588,376 | Fox | Mar. 11, 1952 |
| 2,627,033 | Jensen et al. | Jan. 27, 1953 |
| 2,629,000 | Olson et al. | Feb. 17, 1953 |
| 2,782,366 | Wall | Feb. 19, 1957 |
| 2,812,492 | Pfleger | Nov. 5, 1957 |

FOREIGN PATENTS

| | | |
|---|---|---|
| 639,741 | Great Britain | July 5, 1950 |